United States Patent
Patil et al.

(10) Patent No.: US 10,873,899 B2
(45) Date of Patent: Dec. 22, 2020

(54) ACCESS POINT INITIATED NEIGHBOR REPORT REQUEST

(71) Applicant: QUALCOMM Incorporated, San Diego, CA (US)

(72) Inventors: Abhishek Pramod Patil, San Diego, CA (US); George Cherian, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 15/397,609

(22) Filed: Jan. 3, 2017

(65) Prior Publication Data

US 2017/0118703 A1 Apr. 27, 2017

Related U.S. Application Data

(63) Continuation of application No. 14/630,518, filed on Feb. 24, 2015, now Pat. No. 9,642,071.
(Continued)

(51) Int. Cl.
*H04W 48/16* (2009.01)
*H04W 36/00* (2009.01)
(Continued)

(52) U.S. Cl.
CPC ........ *H04W 48/16* (2013.01); *H04W 36/0083* (2013.01); *H04W 48/14* (2013.01); *H04W 84/12* (2013.01)

(58) Field of Classification Search
CPC combination set(s) only.
See application file for complete search history.

(56) References Cited

U.S. PATENT DOCUMENTS

2002/0057688 A1* 5/2002 Hamasaki .......... H04Q 11/0062
370/390
2002/0156888 A1* 10/2002 Lee ..................... H04L 41/0856
709/224
(Continued)

FOREIGN PATENT DOCUMENTS

CN 103384190 A 11/2013
EP 2661135 A1 11/2013
(Continued)

OTHER PUBLICATIONS

Hermann S.D., et al., "Investigation of IEEE 802.11k-based Access Point Coverage Area and Neighbor Discovery", Local Computer Networks, 2007, LCN 2007, 32nd IEEE Conference on, IEEE, PI, Oct. 1, 2007 (Oct. 1, 2007), pp. 949-954, XP031153146, ISBN: 978-0-7695-3000-0, p. 950, paragraph III—p. 951, paragraph III.B.
(Continued)

*Primary Examiner* — Huy D Vu
*Assistant Examiner* — Bao G Nguyen
(74) *Attorney, Agent, or Firm* — Moore IP/Qualcomm

(57) ABSTRACT

Methods, apparatuses, and systems are described that implement techniques and protocols to enable a station to receive a neighbor query request from a first associated access point that is associated with the station. The station may wirelessly communicate a neighbor report of a second access point to the first access point while the station is unassociated with the second access point.

27 Claims, 6 Drawing Sheets

Related U.S. Application Data

(60) Provisional application No. 61/946,410, filed on Feb. 28, 2014.

(51) Int. Cl.
*H04W 48/14* (2009.01)
*H04W 84/12* (2009.01)

(56) References Cited

U.S. PATENT DOCUMENTS

| | | | | |
|---|---|---|---|---|
| 2006/0136419 | A1* | 6/2006 | Brydon | G06Q 10/107 |
| 2007/0064655 | A1* | 3/2007 | Ruuska | H04W 28/18 370/332 |
| 2007/0258384 | A1* | 11/2007 | Sammour | H04W 36/24 370/252 |
| 2008/0068989 | A1* | 3/2008 | Wyk | G01D 4/004 370/229 |
| 2010/0250673 | A1* | 9/2010 | Laroia | H04W 4/02 709/204 |
| 2012/0155322 | A1* | 6/2012 | Lamba | H04L 45/02 370/254 |
| 2013/0064175 | A1 | 3/2013 | Pandey et al. | |
| 2013/0070644 | A1 | 3/2013 | McCann et al. | |
| 2013/0073746 | A1* | 3/2013 | Singh | H04W 56/00 709/248 |
| 2013/0294427 | A1* | 11/2013 | Kim | H04W 16/14 370/338 |
| 2014/0199993 | A1* | 7/2014 | Dhanda | H04W 52/38 455/423 |
| 2014/0241226 | A1* | 8/2014 | Jia | H04W 48/14 370/311 |
| 2014/0254454 | A1* | 9/2014 | Calcev | H04W 48/20 370/312 |
| 2015/0249954 | A1* | 9/2015 | Patil | H04W 48/16 370/338 |
| 2016/0323853 | A1* | 11/2016 | Kim | H04W 72/12 |

FOREIGN PATENT DOCUMENTS

| | | |
|---|---|---|
| JP | 2009539296 A | 11/2009 |
| JP | 2015528660 A | 9/2015 |
| WO | 2007138530 A2 | 12/2007 |
| WO | 2012135120 A1 | 10/2012 |
| WO | 2014025216 A1 | 2/2014 |

OTHER PUBLICATIONS

International Search Report and Written Opinion—PCT/US2015/017670—ISA/EPO—dated Jun. 9, 2015.

Mano H., "802.11ai—Improving WLAN System Performance; 11-13-1325-04-00ai-802-11ai-improving-wlan-system-performance", IEEE Draft; 11-13-1325-04-00AI-802-11AI-Improving-WLAN-System-Performance, IEEE-SA Mentor, Piscataway, NJ USA, vol. 802.11ai, No. 4, Nov. 11, 2013 (Nov. 11, 2013), pp. 1-26, XP068063307, [retrieved on Nov. 11, 2013] pp. 6,9.

Hart B., "Normative Text Proposal Resolving LB83 Comment 416 on Vendor Specific Subelements," IEEE 802.11-06/0921r0, IEEE, URL:https://mentorieee.org/802.11/dcn/06/11-06-0921-00-000k-normative-text-proposal-resolving-lb83-comment-416-vendor-specifc-subelements.doc, May 16, 2006, 4 pages.

Kneckt J., et al., "802.11ai—Improving WLAN System Performance," IEEE 802.11-13/1325r5, IEEE, URL:https://mentor.ieee.org/802.11/dcn/13/11-13-1325-05-00ai-802-11ai-improving-wlan-system-performance.ppt, Nov. 6, 2013, Slide 1-26.

Mano H., et al., "Experimental trial of Wireless LAN FILS (Fast Initial Link Setup)," Proceedings of Multimedia, Distributed, Cooperative and Mobile (DICOMO2013) Symposium, [CD-ROM] IPSJ Symposium Series, Japan, The Information Processing Society of Japan, Jul. 2013, vol. 2013, No. 2, pp. 1634-1639.

\* cited by examiner

ACCESS POINT INITIATED NEIGHBOR REPORT REQUEST

I. CROSS-REFERENCE TO RELATED APPLICATIONS

The present application claims benefit of U.S. Provisional Patent Application No. 61/946,410 filed on Feb. 28, 2014, and claims priority from and is a Continuation Application of U.S. patent application Ser. No. 14/630,518 filed on Feb. 24, 2015, the contents of each of which are expressly incorporated by reference in their entirety.

II. FIELD

The present disclosure is generally related to a neighbor report request initiated by an access point.

III. DESCRIPTION OF RELATED ART

The Institute of Electrical and Electronics Engineers (IEEE) has promulgated various industry specifications related to wireless networking, many of which are designated with the "IEEE 802.11" name. Typically, before a specification is drafted, a study group and/or task group is formed to evaluate the interest and feasibility of particular wireless technology. For example, the "ai" task group (referred to as TGai or IEEE 802.11ai) is related to fast initial link setup (FILS). The TGai defines neighborhood information, such as a short neighbor report (SNR) information element (IE), that can be transmitted by an access point in a beacon, a probe response, or a FILS discovery frame. However, TGai does not specify a manner in which the neighborhood information is gathered by the access point or any other device. The IEEE 802.11k standard defines radio measurement techniques that enable an access point to gather information about the access point's neighborhood (e.g., neighboring/surrounding access points) by requesting a beacon report (e.g., a measurement report that is in compliance with the IEEE 802.11k standard) from stations that are associated with the access point. To generate a beacon report, a station may monitor communication channels for beacons/probe responses wirelessly communicated by neighboring/surrounding access points and identify each of the detected neighboring/surrounding access points in the beacon report. This information gathering process can be slow under high traffic conditions and/or if the number of associated stations is small. Additionally, under 802.11k, a station may request a neighbor report from its associated access point; however, the station is unable to request a neighbor report from neighboring/surrounding access points that the station is not associated with.

IV. SUMMARY

The present disclosure presents techniques and protocols that enable a first access point, such as an 802.11ai compliant access point, to generate, maintain, or update a first neighbor report, such as a neighbor list, that identifies neighboring access points of the first access point. For example, the first access point may generate, maintain, or update the first neighbor report based on neighboring/surrounding access points identified in a neighbor report of another access point, such as a second access point. To illustrate, the first access point may request a station, such as a mobile station, associated with the first access point, to wirelessly communicate a second neighbor report of the second access point to the first access point even though the station is not associated with the second access point. To request the station to wirelessly communicate the second neighbor report, the first access point may wirelessly communicate a neighbor query request to the station, such as a neighbor query request that is included as part of an 802.11k beacon report request.

Responsive to the neighbor query request, the station may wirelessly communicate the second neighbor report (of the second access point) to the first access point. Based on a report message including the second neighbor report, the first access point may generate, maintain, or update the first neighbor report to identify access points identified in the second neighbor report. Accordingly, the first access point may quickly gather information about the first access point's neighborhood based on a neighbor report from another access point. Gathering information based on the neighbor report may be faster than gathering such information by causing stations associated with the first access point to monitor a communication channel for a beacon, to generate a beacon report (e.g., in accordance with the IEEE 802.11k standard and/or another standard, such as a Wi-Fi Alliance standard) based on a detected beacon and to wirelessly communicate the beacon report to the first access point.

To obtain the second neighbor report from the second access point, the station may wirelessly communicate a neighbor report request to the second access point. Responsive to the neighbor report request, the station may receive a first report message from the second access point and may forward the first report message to the first access point. The first report message may include at least the portion of a second neighbor report of the second access point.

Additionally or alternatively, to obtain the second neighbor report, the station may scan a channel to receive a neighbor report from a neighboring/surrounding access point. Such scanning may be "passive," such as by listening for beacons, or "active," such as by soliciting a probe response in response to a probe request. To illustrate, if the station is compliant with 802.11k and supports 802.11ai, the station may scan for a beacon/probe response message or a fast initial link setup (FILS) discovery frame of a neighboring 802.11ai compliant access point. The beacon/probe response message or the FILS discovery frame wirelessly communicated by the neighboring access point may include a short neighbor report (SNR) of the neighboring access point. The station may include the SNR from the neighboring access point in a beacon report provided to the first access point.

The present disclosure thus enables an access point to quickly gather information about its neighboring access points by delegating such information gathering to individual stations associated with the access point. Moreover, by requesting an associated station to obtain a neighbor report on its behalf, the access point can continue uninterrupted operation of its operating channel while the station wirelessly communicates over another channel to identify the other access points.

In some implementations, the station may have already stored neighbor reports from a neighboring/surrounding access point prior to receiving the neighbor query request from the first access point. Accordingly, in response to the neighbor query request, the station may retrieve the second neighbor report from a memory of the station and may wirelessly communicate the second neighbor report to the first access point without having to wirelessly communicate a neighbor report request to the second access point and without having to scan a channel in response to the neighbor query request.

In a particular example, a method includes receiving a neighbor query request from a first access point at a mobile station associated with the first access point. The method further includes wirelessly communicating a neighbor report of a second access point from the mobile station to the first access point while the mobile station is unassociated with the second access point.

In another particular example, an apparatus includes a processor and a memory accessible by the processor. The memory includes instructions executable by the processor to receive a neighbor query request from a first access point at a mobile station associated with the first access point. The instructions further cause the processor to initiate a neighbor report of a second access point to be wirelessly communicated from the mobile station to the first access point while the mobile station is unassociated with the second access point.

In another particular example, an apparatus includes means for receiving a neighbor query request from a first access point at a station associated with the first access point. The apparatus further includes means for wirelessly communicating a neighbor report of a second access point from the station to the first access point while the station is unassociated with the second access point.

One particular advantage provided by at least one of the disclosed aspects is that an unsecured message, such as a public action frame, may be used to enable the station to request and receive a neighbor report from an unassociated access point. Additionally or alternatively, the station may receive a neighbor report from an access point that the station is not associated with by scanning a communication channel for a message, such as a beacon, a probe response message, and/or a FILS discovery frame, wirelessly communicated by an 802.11ai compliant neighboring access point. Accordingly, the station can remain associated with an access point while the station requests and receives a neighbor report from another access point. By communicating the neighbor report of the unassociated access point to the associated access point, the station may enable the associated access point to maintain its own neighbor report, such that the neighbor report of the associated access point is a "complete" report. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Particular aspects of the present disclosure are described with reference to the drawings. In the description, common features are designated by common reference numbers throughout the drawings.

Figure 1A:
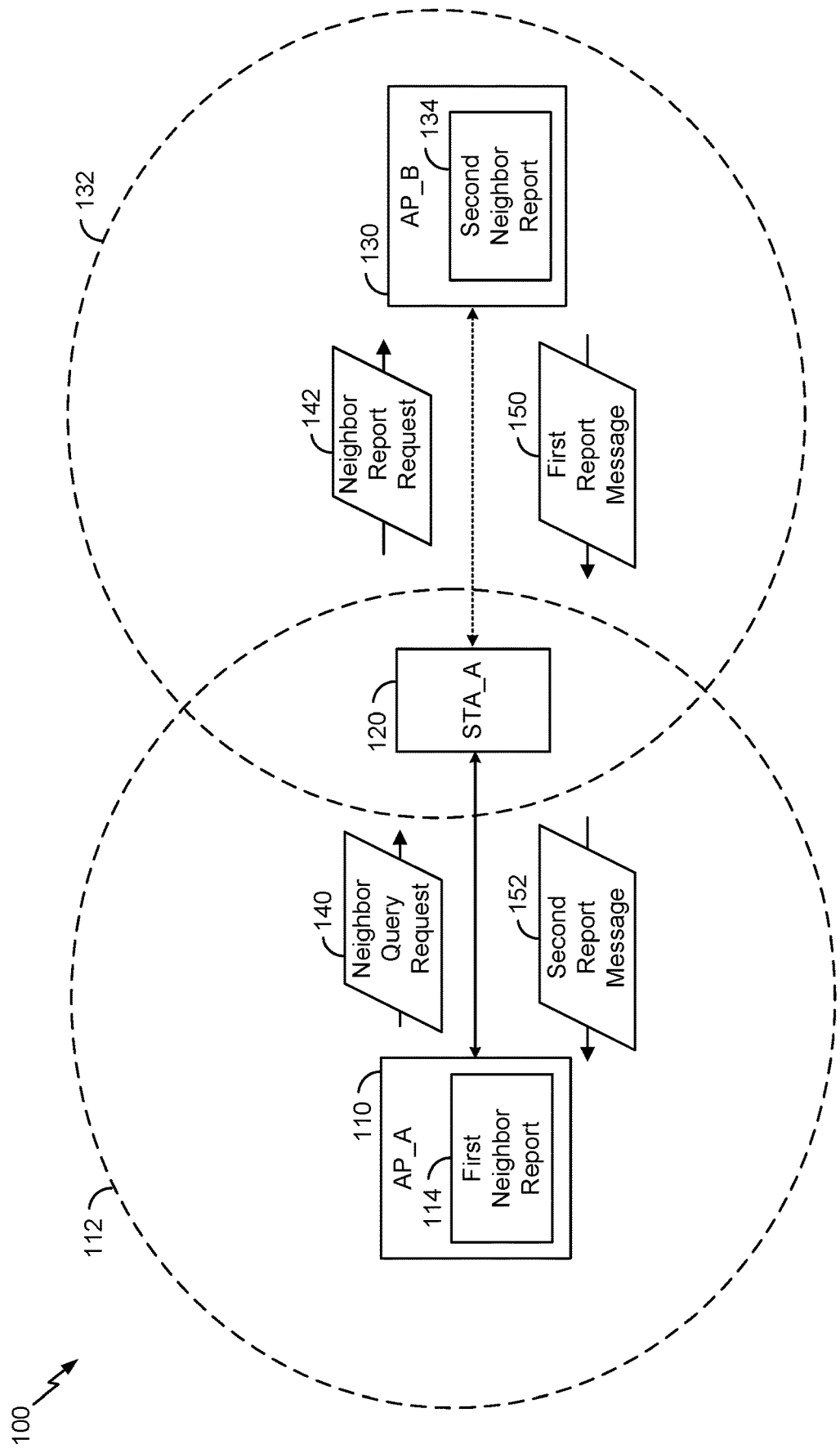
FIGS. 1A and 1B depict a first illustrative aspect of a system that enables an access point initiated neighbor report request.

Referring to FIG. 1A, a first aspect of a system 100 that is operable to enable an access point initiated neighbor report request is shown. The system 100 includes a first access point (AP) 110, designated AP_A in FIG. 1A, a station (STA) 120 (alternately referred to herein as a mobile device) and designated STA_A in FIG. 1A), and a second access point 130 (designated AP_B). It should be noted that although FIG. 1A depicts two access points 110, 130, any number of access points may be present in the system 100. Additionally, it should be noted that although FIG. 1A depicts a single station 120, any number of stations may be present in the system 100. Each of the first access point 110, the station 120, and the second access point 130 may operate in compliance with a standard, such as an IEEE 802.11 standard (e.g., IEEE 802.11k, IEEE 802.11ai, or both) and/or a Wi-Fi Alliance standard (e.g., an optimized connectivity experience (OCE) standard, a multi-band operation (MBO) standard, or both), as illustrative, non-limiting examples.

The station 120 may be an electronic device that is operable to wirelessly communicate and receive data via a wireless network. For example, the station 120 may be a wireless phone, a personal digital assistant (PDA), a portable computing device, a tablet computing device, a portable media player, or any combination thereof, as illustrative, non-limiting examples. The station 120 may be configured to perform an authentication process, such as a handshake and key exchange process, with an access point. For example, the station 120 may perform an authentication process with the first access point 110 to establish an authenticated session (e.g., an associated session) with the first access point 110. If an authenticated session is established between the station 120 and the first access point 110, the station 120 may be considered as associated with (e.g., in an associated state with) the first access point 110. The authenticated session may enable secure (e.g., encrypted) communication between the station 120 and the first access point 110. If the station 120 wirelessly communicates with the first access point 110 during an authenticated session (as indicated by a solid line between the station 120 and the first access point 110), the station 120 may be considered as associated with the first access point 110. If the station 120 is in an unassociated state, which may include an unauthenticated state, with the first access point 110, the station 120 and the first access point 110 may wirelessly communicate with each other using an unsecured message, such as a probe response message, a public action frame, a beacon, and/or an unencrypted control message, as illustrative, non-limiting examples.

Each of the access points 110, 130 may be a node of a wireless network. For example, each of the access points 110, 130 may be an IEEE 802.11 access point that supports its own wireless data network. To illustrate, the first access point 110 may support a first network 112 and the second access point 130 may support a second network 132. Each of the access points 110, 130 may store and/or maintain a neighbor report. For example, the first access point 110 may store a first neighbor report 114 that identifies neighboring access points of the first access point 110, and the second access point 130 may store a second neighbor report 134 that identifies neighboring access points of the second access point 130.

For each neighboring access point indicated or referenced in a neighbor report, such as the first neighbor report 114 or the second neighbor report 134, the neighbor report may also indicate an operating channel of the neighboring access point, a media access control (MAC) address of the neighboring access point, a signal strength (e.g., a received signal strength indication (RSSI)) of the neighboring access point, another parameter related to the neighboring access point, or a combination thereof, as illustrative, non-limiting examples. For example, the first neighbor report 114 and/or the second neighbor report 134 may include a short neighbor report (SNR) that is compliant with the IEEE 802.11ai standard.

Figure 1B:
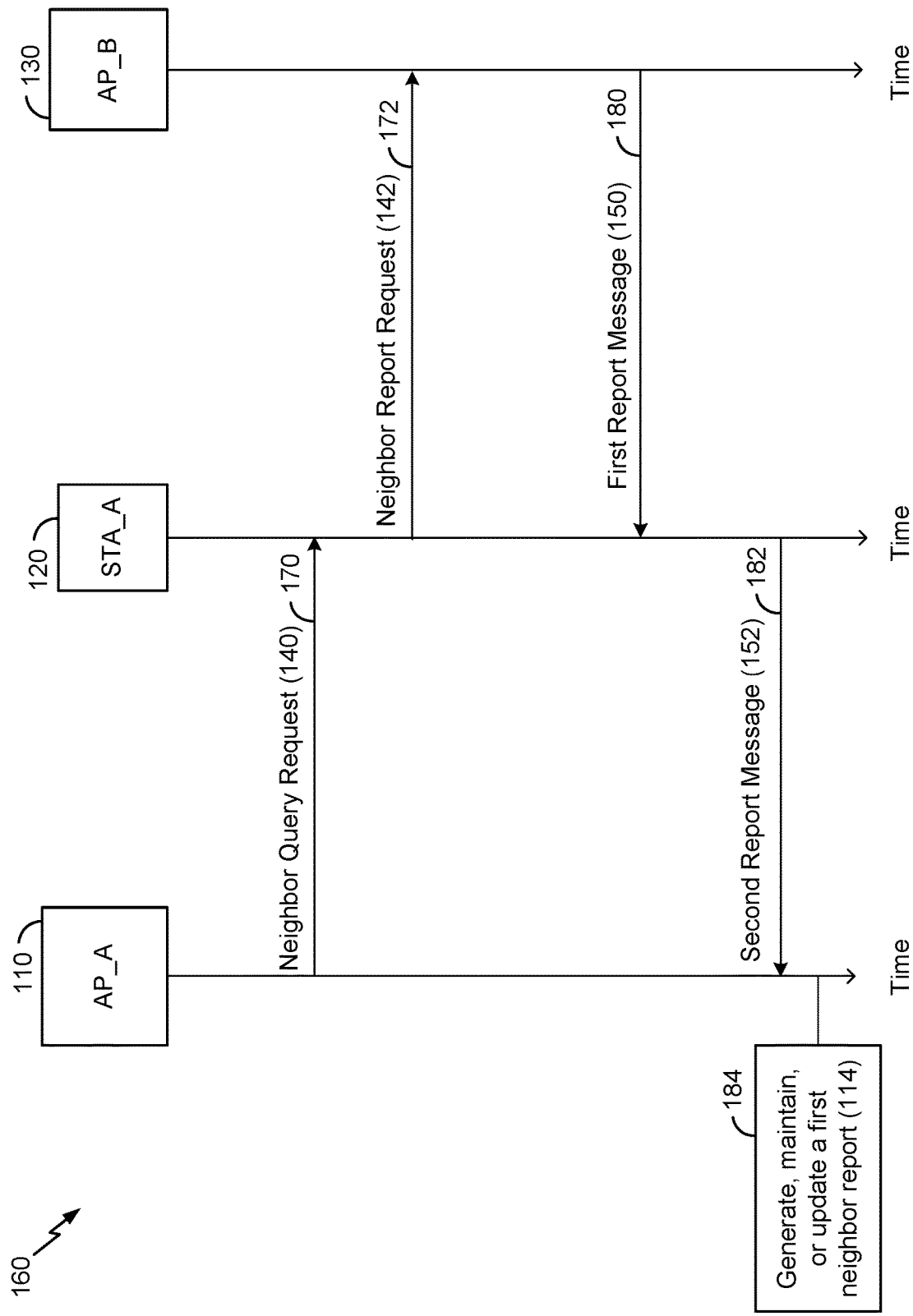

Referring to FIG. 1B, a ladder diagram illustrating operation of the system 100 is depicted and generally designated 160. During operation of the system 100, the station 120 may be associated with the first access point 110. The station 120 may receive a neighbor query request 140 from the first access point 110, at a first time 170. The neighbor query request 140 may include information that effectively instructs (or causes) the station 120 to provide a neighbor report from another access point, such as a neighbor report received from the second access point 130. The station 120 may be unassociated with the second access point 130 when the neighbor query request 140 is received.

The station 120 may wirelessly communicate a neighbor report request 142 to the second access point 130 at a second time 172. For example, the station 120 may wirelessly communicate the neighbor report request 142 to the second access point 130 in response to receiving the neighbor query request 140. The station 120 may be associated with the first access point 110 and may be unassociated with the second access point 130 at the time when the neighbor report request 142 is received. The neighbor report request 142 may request the second access point 130 to wirelessly communicate the second neighbor report 134 of the second access point 130 to the station 120.

The second access point 130 may wirelessly communicate a first report message 150 to the station 120 in response to the neighbor report request 142, at a third time 180. The station 120 may receive the first report message 150 from the second access point 130 while the station 120 is unassociated with the second access point 130 and while the station 120 remains associated with the first access point 110. The first report message 150 may include the second neighbor report 134 (or information from the second neighbor report 134) of the second access point 130. The first report message 150 may be in compliance with a standard, such as an IEEE 802.11 standard (e.g., the IEEE 802.11ai standard). For example, the first report message 150 may include an SNR of the second neighbor report 134 that is in compliance with the IEEE 802.11ai standard.

After receiving the first report message 150, the station 120 may wirelessly communicate a second report message 152 to the first access point 110, at a fourth time 182. The station 120 may wirelessly communicate the second report message 152 to the first access point 110 while the station 120 is unassociated with the second access point 130 and while the station 120 is associated with the first access point 110. The second report message 152 may be based on the first report message 150 received from the second access point 130 and may include the second neighbor report 134 (or information from the second neighbor report 134) included in the first report message 150. For example, the station 120 may forward the first report message 150 to the first access point 110 as the second report message 152 without modifying the first report message 150.

Alternatively, the station 120 may alter content of the first report message 150 (or a format of the first report message 150) and may wirelessly communicate the modified first report message 150 as the second report message 152. For example, the station 120 may combine the second neighbor report 134 included in the first report message 150 with a neighbor report from another access point to generate a combined neighbor report that is included in the second report message 152. In a particular implementation, the second report message 152 is in compliance with a standard, such as an IEEE 802.11 standard. For example, the first report message 150 that includes a SNR of the second neighbor report 134 may be forwarded as the second report message 152.

The first access point 110 may generate, maintain, or update a first neighbor report 114 of the first access point 110, as indicated at 184. For example, the first access point 110 may generate, maintain, or update the first neighbor report 114 based on the second neighbor report 134. To illustrate, prior to wirelessly communicating the neighbor query request 140, the first access point 110 may not include the first neighbor report 114, and, after receiving the second neighbor report 134 from the station 120, the first access point 110 may generate the first neighbor report 114 that includes the second neighbor report 134 (or information from the second neighbor report 134). As another example, prior to wirelessly communicating the neighbor query request 140, the first access point 110 may include a first version of the first neighbor report 114, and after receiving the second neighbor report 134, the first access point 110 may update the first neighbor report 114 based on the second neighbor report 134 to generate a second version of the first neighbor report 114. For example, the first access point 110 may add information related to an access point identified in the second neighbor report 134 (received from the station 120 via the second report message 152) to the first neighbor report 114.

By wirelessly communicating the neighbor query request 140 to the station 120, the first access point 110 may request (or instruct) the station 120 to provide the first access point 110 with a neighbor report from another access point, such as the second access point 130, that is unassociated with the station 120. The station 120 can remain associated with the first access point 110 while the station 120 requests and receives neighbor reports from the other access points. The station 120 may wirelessly communicate the neighbor reports of the other access points to the first access point 110 to enable the first access point 110 to generate, maintain, or modify the first neighbor report 114 of the first access point 110. By delegating the gathering of neighbor reports to the station 120, the first access point 110 may not have to actively identify a neighboring access point and may continue uninterrupted operation of its operating channel(s).

Although FIG. 1B illustrates an example of communication between the first access point 110, the station 120, and the second access point 130, in different implementations, the specific types of messages that are used may be different. Illustrative examples of such implementations are described below. Each of the following examples is not exclusive and can be combined with or operate in conjunction with one or more other examples.

In some implementations, the neighbor query request 140 may include information that causes the station 120 to obtain a neighbor report and may designate the manner in which the station 120 is to obtain the neighbor report. For example, the neighbor query request 140 may cause the station 120 to wirelessly communicate a neighbor report request 142. As another example, the neighbor query request 140 may cause the station 120 to obtain a neighbor report by wirelessly communicating an explicit neighbor report request. To illustrate, the neighbor query request 140 may cause the station 120 to scan a communication channel to detect the second neighbor report 134 as part of a beacon, a probe response, or a FILS discovery frame, as described further herein. Additionally or alternatively, the neighbor query request 140 may cause the station 120 to wirelessly communicate a neighbor report that the station 120 may previously have obtained and stored. For example, prior to receiving the neighbor query request 140, the station 120 may store a neighbor report that the station 120 received from an access point previously associated with the station 120 or from an access point previously unassociated with the station 120. To illustrate, the station 120 may have previously received and stored a neighbor report from another access point that the station 120 was associated with prior to receiving the neighbor query request 140. Additionally or alternatively, the station 120 may have previously received and stored a neighbor report from the other access point that the station 120 was unassociated with by scanning a communication channel and receiving a FILS discovery frame from the other access point prior to receiving the neighbor query request 140.

If the station 120 wirelessly communicates the neighbor report request 142 in response to the neighbor query request 140, the neighbor report request 142 may be a directed request wirelessly communicated to a specific access point or the neighbor report request 142 may be a broadcast request. In some implementations, the neighbor report request 142 is included in an unsecured message, such as a probe response message or a public action frame, that the station 120 wirelessly communicates to an unassociated access point, such as the second access point 130.

To illustrate, the unsecured message may include a vendor specific public action frame. If the unsecured message includes the vendor specific public action frame, the vendor specific public action frame may have a category value (e.g., category type field) of 9 (e.g., value=9). If the vendor specific public action frame is used, electronic devices (e.g., the first access point 110, the station 120, the second access point 130, or a combination thereof) manufactured by the same vendor, distributed by the same vendor, and/or operated according to software provided by the same vendor, may wirelessly communicate when not associated with each other. To illustrate, if the unsecured message is a probe request message wirelessly communicated by the station 120 to the second access point 130, the probe request message may solicit a probe response message from the second access point 130. The probe response message may include the first report message 150.

If the station 120 and the second access point 130 are from different vendors and the station 120 wirelessly communicates the vendor specific public action frame to the second access point 130, the second access point 130 may ignore the vendor specific public action frame or may respond to the vendor specific public action frame with a response message that includes an asserted "incapable" flag or "refused" flag in the response message. For example, the second access point 130 may identify the station 120 as being from a different vendor than a vendor of the second access point 130 and may ignore the vendor specific public action frame. If the station 120 receives no response on a particular channel, the station 120 may not know if an access point is available via the particular channel. However, if the station 120 receives a response message that includes the asserted "incapable" flag or "refused" flag via the particular channel, the station 120 at least knows that an access point is able to wirelessly communicate via the particular channel. In other implementations, if the station 120 and the second access point 130 have different vendors, the second access point 130 may wirelessly communicate the second neighbor report 134 to the station 120 via an unsecured message, such as a public action frame other than a vendor specific action frame, a beacon, or a probe response message, as illustrative, non-limiting examples. If the station 120 does not receive the first report message 150 from the second access point 130 responsive to the unsecured message or if the first report message 150 includes an asserted "incapable" flag or "refused" flag, the station 120 may not wirelessly communicate the second report message 152 to the first access point 110. For example, if the station 120 receives the first report message 150 that includes the asserted "incapable" flag or "refused" flag, the station 120 may identify the first report message 150 as being communicated by an access point, but may not have enough information about the access point to wirelessly communicate the second report message 152 to the first access point 110.

If the station 120 scans a communication channel responsive to the neighbor query request 140, the station 120 may monitor the communication channel for a beacon, a probe response message, and/or a FILS discovery frame that includes a neighbor report from a surrounding access point, such as a SNR from a surrounding 802.11ai compliant access point. The station 120 may store the detected SNR. For example, the SNR may be stored at a memory (not shown) included in the station 120. Additionally, the station 120 (e.g., a processor and/or a controller included in the station) may retrieve the stored SNR from the memory, and the station 120 may provide the stored SNR to the first access point 110 in response to the neighbor query request 140. In some implementations, the communication channel scanned by the station 120 may be specified based on information included in the neighbor query request 140. For example, the neighbor query request 140 may include information to direct the station 120 to scan a specific communication channel. To illustrate, the station 120 may scan a communication channel used by the second access point 130 and may receive a FILS discovery frame that includes the second neighbor report 134. In other implementations, the neighbor query request 140 may not include information that specifies a channel(s) to be scanned and the station 120 may scan (e.g., iteratively) multiple and/or all supported communication channels in response to receiving the neighbor query request 140. In some implementations, the station 120 may be configured to scan a communication channel without receiving the neighbor query request 140 from the first access point 110. It is noted that if the station 120 obtains the a neighbor report from a particular access point by scanning the communication channel (e.g., for 802.11ai compliant SNRs), the station 120 uses less messaging overhead to obtain the neighbor report as compared to the station 120 wirelessly communicating an unsecured message to the particular access point, such as a public action frame or a probe request message, to solicit the a neighbor report of the particular access point.

In some implementations, the first access point may include the neighbor query request 140 in a beacon report request (e.g., a beacon report request frame) wirelessly communicated from the first access point 110 to the station 120. For example, the neighbor query request 140 may be included in a vendor specific field of the beacon report request frame, a reserved field of the beacon report request frame, a measurement request field of the beacon report request, another field of the beacon report request frame, or a combination thereof, as illustrative, non-limiting examples. In some implementations, the beacon report request frame may be an IEEE 802.11k measurement request. The beacon report request may be embedded with directives for the station 120 to provide a stored neighbor report (e.g., a neighbor report based on a 802.11ai compliant SNR received via a beacon, a probe response, or a FILS discovery frame), to scan a communication channel to obtain a neighbor report, and/or to request a neighboring access point to provide a neighbor report, as described further herein.

If the beacon report request includes information that directs the station 120 to access a beacon table, the station 120 may identify a neighbor access point based on a stored beacon table. For example, the beacon table may be stored at a memory (not shown) included in the station 120. The beacon table may include one or more entries that each identifies an unassociated access point that the station 120 received a beacon message from. Accordingly, the beacon table may include historical data gathered by the station 120. In some implementations, the station 120 (e.g., a processor and/or controller included in the station 120) may access the beacon table and identify an access point included in the beacon table in response to receiving the beacon report request, regardless of whether the beacon report request includes information that directs the station 120 to access the beacon table.

If the beacon report request includes information that directs the station 120 to wirelessly communicate a neighbor report request, the station 120 may wirelessly communicate the neighbor request, such as the neighbor report request 142, to an unassociated access point. For example, the beacon report request frame may include a vendor specific optional sub-element field (e.g., having an ID value=221), which causes the station 120 to query the neighboring access point. Alternatively or additionally, a reserved field of the beacon report request frame may be used by the first access point 110 to provide the neighbor query request 140 to the station 120. For example, the beacon report request frame may include a measurement request field that includes an optional sub-element field. The optional sub-element field may be populated with a request element that includes a short neighbor report (SNR) element identifier (ID). The SNR element ID may be used to cause the station 120 to request an SNR from a neighboring access point, such as a neighboring access point that is in compliance with IEEE 802.11ai. In some implementations, the beacon report request may indicate a channel that the station 120 is to use to wirelessly communicate the neighbor report request 142. Additionally or alternatively, the SNR element ID may be used to cause the station 120 to wirelessly communicate a neighbor report request to an access point that is not in compliance with IEEE 802.11ai.

If the beacon report request includes information that directs the station 120 to scan a communication channel, the station 120 may tune to a communication channel identified in the beacon report request. For example, the beacon report request frame may include data that specifies one or more channels (e.g., in a channel number field of the beacon report request frame) that the station 120 is to monitor for beacon messages or probe response messages from different access points. The station 120 may parse the beacon report request to identify the one or more specified channels and may monitor each of the specified channels for beacon messages, probe response messages, and/or FILS discovery frames that include neighbor reports from surrounding access points. If the channel number field of the beacon report request frame is set to a value of zero (0), the station 120 may perform (e.g., iteratively) measurements on all supported communication channels. In some implementations, the station 120 may scan, as well as wirelessly communicate a neighbor report request on, each channel indicated by the beacon report request.

As an example, the station 120 may receive a beacon report request from the first access point 110 that requests the station 120 to scan a group of channels. The station 120 may scan the group of channels and identify a first set of channels via which the station 120 received a first set of neighbor reports and a second set of channels via which the station did not receive any neighbor reports. The station 120 may wirelessly communicate neighbor report requests, such as the neighbor report request 142, via each channel of the second set of channels in an attempt to obtain additional neighbor reports from unassociated access points that may be using a particular channel included in the second set of channels. Each neighbor report request may be included in an unsecured message, such as a probe response message or a public action frame (e.g., a vendor specific public action frame). In response to the neighbor report requests, the station 120 may receive a second set of neighbor reports via the second set of channels.

In response to a beacon report request received from the first access point 110, the station 120 may generate the beacon report. The beacon report may be generated in compliance with IEEE 802.11k and/or in compliance with another standard. The beacon report may indicate an access point and/or a neighbor report that the station 120 received and/or identified in response to the beacon report request. For example, the station 120 may have received the neighbor report by passively by monitoring different communication channels and/or by actively communicating (e.g., sending out) neighbor report requests on different communication channels. As another example, the station 120 may have identified an access point based on a beacon table stored at the station 120. For each access point identified in the beacon report, the beacon report may include an operating channel of the access point, a media access control (MAC) address of the access point, a signal strength (e.g., a received signal strength indication (RSSI)) of the access point as determined at the station 120, another parameter related to the access point, or a combination thereof, as illustrative, non-limiting examples.

If the beacon report request frame includes the neighbor query request 140, the station 120 may provide the beacon report and a neighbor report to the first access point 110. In some implementations, the neighbor report may be wirelessly communicated separate from the beacon report. For example, the beacon report may be wirelessly communicated from the station 120 to the first access point 110 before or after the station 120 wirelessly communicates the neighbor report to the first access point 110. If the station 120 wirelessly communicates multiple neighbor reports to the first access point 110, the multiple neighbor reports may be wirelessly communicated individually and/or in groups. In other implementations, the neighbor report may be included in the beacon report. For example, the beacon report may include the second report message 152. Accordingly, the station 120 may wirelessly communicate multiple neighbor reports to the first access point 110 individually (e.g., in separate messages), in groups (e.g., multiple neighbor reports included in a message), separately from a beacon report, or included in a beacon report, as illustrative, non-limiting examples. By providing the first access point 110 with the beacon report and/or the neighbor report, the station 120 may inform the first access point 110 of a greater number of neighboring access points as compared to a number of neighboring access points identified by only a beacon report or only an individual neighbor report.

The first access point 110 may receive the neighbor report and/or the beacon report from the station 120. The beacon report may identify a first set of neighboring access points and the second neighbor report 134 may identify a second set of neighboring access points. In some implementations, an access point may be included in both the first set of neighboring access points and in the second set of neighboring access points. The first access point 110 may generate, maintain, and/or update the first neighbor report 114 by identifying or referencing access points that are in the first set of neighboring access points, in the second set of access points, or both. For example, the first access point 110 may generate the first neighbor report 114, add an access point to the first neighbor report 114, remove an access point from the first neighbor report 114, or keep the first neighbor report 114 unchanged based on the received beacon report and/or the received neighbor report.

In a particular implementation, the station 120 may wirelessly communicate a request to the first access point 110 to request the first access point 110 to provide the first neighbor report 114, such as a request that is in compliance with 802.11k. For example, the station 120 may wirelessly communicate the request prior to or subsequent to receiving the neighbor query request 140 from the first access point 110. Based on the request, the first access point 110 may wirelessly communicate (e.g., a most recently updated version of) the first neighbor report 114 to the station 120. The station 120 may store the neighbor report received from the first access point 110. For example, the first access point 110 may wirelessly communicate the first neighbor report 114 to the station 120 as a short neighbor report (SNR) that includes information that identifies a channel (e.g., operational channel) of the first access point 110 and a target beacon transmission time (TBTT) for the first access point 110. The TBTT may be represented as an offset from a time that the SNR was wirelessly communicated (e.g., transmitted) to the station 120. The first neighbor report 114 may identify or reference one or more access points neighboring (e.g., surrounding) the first access point 110. The first neighbor report 114 may enable the station 120 to quickly select an available access point to associate with and may reduce a scan time and/or a probing overhead on the part of the station 120.

Although operations of the system 100 have been described with reference to the first access point 110, the station 120, or the second access point 130, it should be noted that the first access point 110, the station 120, and the second access point 130 may each be configured to perform operations described with reference to another device. For example, the first access point 110 may be configured to receive a neighbor report request from an unassociated station (e.g., a station in an associated state with the second access point 130) and to provide at least a portion of the first neighbor report 114 to the unassociated station.

By causing the station 120 to request a neighbor report directly from a neighboring access point, the first access point 110 may more quickly identify neighboring access points than if the station 120 gathers the neighbor report by monitoring a communication channel and generating a beacon report (in accordance with the IEEE 802.11k standard and/or in accordance with another standard). For example, the first access point 110 can request (or cause) the station 120 to wirelessly communicate a neighbor report obtained by the station 120 from other (surrounding) access points, even though the station 120 may be unassociated with the other access points. Because the station 120 may be located anywhere within a coverage range of the first access point 110 (e.g., positioned at a physical location remote from the first access point 110), the station 120 may be within a coverage range of another access point that is not visible to or in-range of the first access point 110. Additionally, because the first access point 110 may be busy servicing another associated station using a particular operating channel (e.g., a communication channel), the first access point 110 may not be able to turn off the particular operating channel to scan for or to request neighbor reports from other access points. Thus, by requesting the associated station 120 to obtain a neighbor report on behalf of the first access point 110, the first access point 110 can continue uninterrupted operation on its operating channel while the station 120 monitors another channel for surrounding access points.

Additionally, if a beacon report is utilized in addition to the neighbor report(s) from the neighboring access point(s), the first access point 110 can use the beacon report to confirm the neighboring access point(s) identified by the neighbor report(s) and can update the first neighbor report 114 to include confirmed neighboring access point(s). By maintaining the first neighbor report 114, the first access point 110 may be able to provide, based on the first neighbor report 114, a short neighbor report (SNR) to a station that is unassociated with the first access point 110. The short neighbor report (SNR) may enable the station to quickly find/identify neighboring access points, thus reducing a scan time and/or a probing overhead on the part of the station.

By utilizing unsecured messages, scanning a communication channel for a message (e.g., a beacon, a probe response message, or a FILS discovery frame) that is in compliance with 802.11ai, and/or by storing a neighbor report, the station 120 may provide the first access point 110 with a neighbor report from an access point that the station 120 is not associated with while the station 120 remains associated with the first access point 110. By receiving the neighbor report of another access point via the station 120, the first access point 110 (e.g., an 802.11ai compliant access point) may obtain a "complete" understanding of its neighborhood, so that its own SNR may be a "complete" report.

Figure 2:
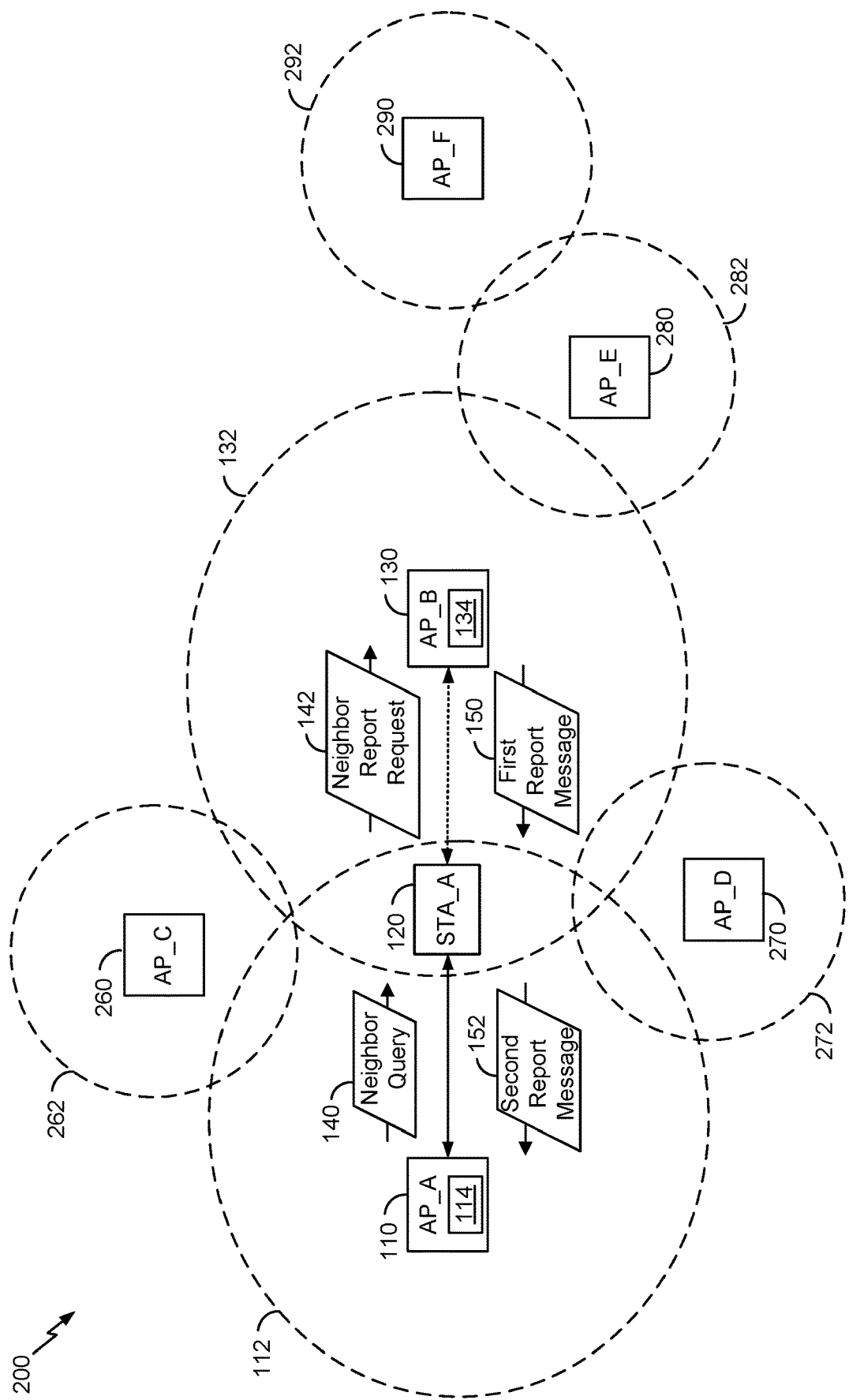
FIG. 2 is a block diagram of a second illustrative aspect of a system that enables an access point initiated neighbor report request.

Referring to FIG. 2, a second aspect of a system 200 that is operable to enable an access point initiated neighbor report request is shown. The system 200 includes the first access point 110, the station 120, the second access point 130, a third access point (designated AP_C) 260, a fourth access point (designated AP_D) 270, a fifth access point (designated AP_E) 280, and a sixth access point (designated AP_F) 290. It should be noted that although FIG. 2 depicts six access points 110, 130, 260, 270, 280, 290, any number of access points may be present in the system 200. Additionally, it should be noted that although FIG. 2 depicts a single station 120, any number of stations may be present in the system 200. Each of the access points 110, 130, 260, 270, 280, 290 and the station 120 may operate in compliance with a standard, such as an IEEE 802.11 standard and/or a Wi-Fi Alliance standard.

Each of the access points 110, 130, 260, 270, 280, 290 may be a node of a wireless network, such as an IEEE 802.11 access point that supports its own wireless network. For example, the first access point 110 may support the first network 112, the second access point 130 may support the second network 132, the third access point 260 may support a third network 262, the fourth access point 270 may support a fourth network 272, the fifth access point 280 may support a fifth network 282, and the sixth access point 290 may support a sixth network 292. Each of the access points 110, 130, 260, 270, 280, 290 may include (e.g., store) its own neighbor report. As described with reference to the first neighbor report 114 of FIG. 1A, each access point's neighbor report may identify a neighboring access point and may be generated (e.g., populated) based on a beacon report, another neighbor report, or a combination thereof.

Like in FIG. 1, in FIG. 2 the station 120 is associated with the first access point 110, as indicated by a solid line between the station 120 and the first access point 110. The station 120 is also in a coverage area of the second access point 130 and in an unassociated state (e.g., in a pre-associated state) with the second access point 130. If the station 120 is unassociated with the second access point 130, the station 120 and the second access point 130 may wirelessly communicate using unsecured messages (as indicated by a dashed line between the station 120 and the second access point 130). The station 120 may be outside the coverage areas of and may be unassociated with each of the third access point 260, the fourth access point 270, the fifth access point 280, and the sixth access point 290.

During operation, the station 120 may receive the neighbor query request 140 from the first access point 110. Based on the neighbor query request 140, the station 120 may wirelessly communicate a neighbor report to the first access point 110. For example, the station 120 may wirelessly communicate the neighbor report to the first access point 110 as part of the report message 152. In some implementations, the station 120 may also provide the first access point 110 with a beacon report that is included in the report message 152. For example, the station 120 may provide the beacon report in response to a beacon report request received from the first access point 110.

In a particular implementation, responsive to the neighbor query request 140, the station 120 may wirelessly communicate the neighbor report request 142 to the second access point 130. After wirelessly communicating the neighbor report request 142, the station 120 may receive, from the second access point 130, the first report message 150 that is responsive to the neighbor report request 142. The station 120 may wirelessly communicate the second report message 152 (that is based on the first report message 150) to the first access point 110. For example, the station 120 may forward the first report message 150 to the first access point 110 as the second report message 152. Alternatively, the station 120 may modify (e.g., reformat) data received in the first report message 150, and then wirelessly communicate the modified data to the first access point 110 in the second report message 152.

The second access point 130 may include (e.g., store) the second neighbor report 134. The second neighbor report 134 may be generated based on the neighbor reports from other access points, such as the fifth access point 280, and may identify or reference one or more of the access points 110, 260, 270, 280, and 290. From the perspective of the second access point 130, each of the access points 110, 260, 270, and 280 is one hop away and the sixth access point 290 is two hops away. Additionally or alternatively, the second neighbor report 134 may be based on a beacon report received from a particular station that is associated with the second access point 130. The second neighbor report 134 may also identify or reference the second access point 130, or the second access point 130 may be identifiable as a source of the second neighbor report 134 (or a source of the first report message 150), such as based on metadata or a header of the second neighbor report 134 (or the first report message 150).

Accordingly, because the second neighbor report 134 identifies access points that are one hop away (e.g., the access points 110, 260, 270, and 280) and multiple hops away (e.g., the sixth access point 290), the first report message 150 provided from the second access point 130 to the station 120 may also identify each of these access points. Thus, based on the second report message 152, which is generated based on the first report message 150, the first access point 110 may receive neighbor information that identifies an access point, such as the sixth access point 290, that is multiple hops away from the first access point 110. The first access point 110 may generate, maintain, or update the first neighbor report 114 based on the access points identified in the second report message 152. For example, the first access point 110 may generate the first neighbor report 114 of FIG. 1A, including identifying access points that are one hop away (e.g., the access points 130, 260, and 270), access points that are two hops away (e.g., the fifth access point 280), and access points that are three hops away (e.g., the sixth access point 290). Thus, in this example, the first neighbor report 114 may provide a network-wide access point topography.

In another particular implementation, in response to the neighbor query request 140, the second access point 130 may respond with a cumulative beacon report that identifies neighboring access points that were identified based on one or more beacon reports generated by stations associated with the second access point 130. For example, the second neighbor report 134 may identify neighboring access points identified by beacon reports and neighbor reports received by the second access point 130. The cumulative beacon report may be generated by removing access points from the second neighbor report 134 that were not identified in a beacon report received by the second access point 130. To illustrate, the cumulative beacon report may be a reduced version of the second neighbor report 134. As another example, the cumulative beacon report may be distinct from the second neighbor report 134 and may be generated by the second access point 130 based on a beacon report(s) received by the second access point 130. The cumulative beacon report may be provided to the station 120 as part of the first report message 150. In the example of FIG. 2, the cumulative beacon report may identify or reference the first access point 110, the third access point 260, the fourth access point 270, and the fifth access point 280. It is noted that the cumulative beacon report may not include the sixth access point 290, which is multiple hops away from the second access point 130, because the second access point 130 is outside the coverage range of the sixth access point 290 and therefore unable to detect a beacon from the sixth access point 290. The cumulative beacon report may also identify or reference the second access point 130 or the second access point 130 may be identifiable as a source of the cumulative beacon report.

If the second access point 130 receives an unsecured message, such as the neighbor report request 142, from the station 120 requesting a neighbor report, the second access point 130 may wirelessly communicate the first report message 150 that includes the cumulative beacon report to the station 120. The station 120 may generate the second report message 152 based on the first report message 150 and may wirelessly communicate the second report message 152 to the first access point 110. Based on the second report message 152, the first access point 110 may generate, maintain, or update the first neighbor report 114 of FIG. 1A. Accordingly, based on the cumulative beacon report, the first neighbor report 114 may identify a relatively small number of access points that are multiple hops away from the first access point 110. For example, if the second access point 130 provides the station 120 with a cumulative beacon report instead of the second neighbor report 134, the first neighbor report 114 may not identify the sixth access point 290.

By providing the cumulative beacon report, the second access point 130 may limit a number of identified neighboring access points provided to the first access point 110 via the report message(s) 150, 152. The second access point 130 may generate the first report message 150 to identify access points that were identified by the second access point 130 based on beacon reports and to exclude access points that were identified based solely on neighbor reports received via stations associated with the second access point. Accordingly, if the first access point 110 generates, maintains, or updates the first neighbor report 114 of FIG. 1A based on an access point identified in the cumulative beacon report, the first neighbor report 114 may include a relatively small number of neighboring access points that are multiple hops away from the first access point 110. In some implementations, the first access point 110 may be configured to generate a cumulative beacon report by identifying access points that were included in the first neighbor report 114 based on beacon reports received by the first access point 110. The first neighbor report 114 (or the cumulative beacon report generated by the first access point 110) may be used to generate a SNR for use by unassociated stations to quickly identify an available and/or preferred access point to authenticate with. Thus, limiting (e.g., reducing) neighbor access point information at the second access point 130 so that the sixth access point 290 is not identified to the first access point 110 (e.g., is not included in the first neighbor report 114) may not reduce the ability of the station 120 to use the SNR from the first access point 110 to identify an appropriate access point for association. Limiting the number of identified neighboring access points may be desirable in low data rate networks and other scenarios where it is useful to keep neighbor reports and reporting messages short, and/or when a network-wide access point topography is not needed.

Although operations of the system 200 have been described with reference to the first access point 110, the station 120, the second access point 130, the third access point 260, the fourth access point 270, the fifth access point 280, and the sixth access point 290, it should be noted that each of the first access point 110, the station 120, the second access point 130, the third access point 260, the fourth access point 270, the fifth access point 280, or the sixth access point 290, may be configured to perform operations described with reference to another device (e.g., the first access point 110, the station 120, the second access point 130, the third access point 260, the fourth access point 270, the fifth access point 280, or the sixth access point 290). For example, the first access point 110 may be configured to provide a cumulative beacon report generated by the first access point 110 in response to a neighbor report request received from an unassociated station, such as a station (not shown) associated with the second access point 130.

Figure 3:
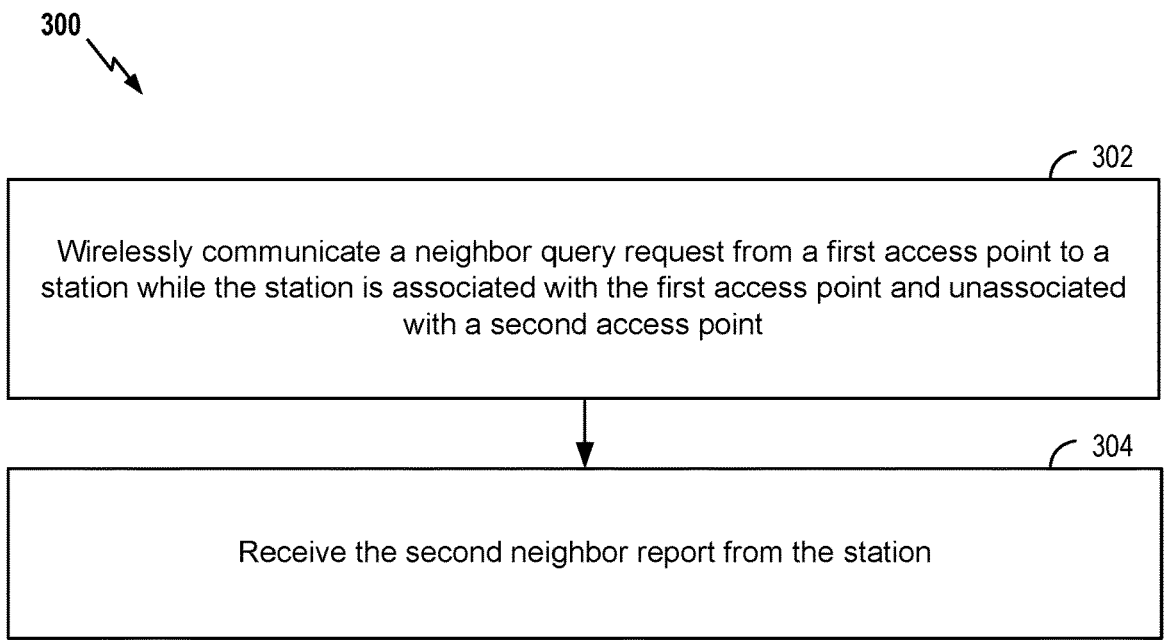
FIG. 3 is a flow diagram of an illustrative method of operating an access point.

Referring to FIG. 3, an illustrative method of operating an access point is described and designated 300. The method 300 may be performed using one of the access points 110, 130 of FIGS. 1A and 2 or one of the access points 260, 270, 280, 290 of FIG. 2.

The method 300 includes wirelessly communicating a neighbor query request from a first access point to a station while the station is associated with the first access point and unassociated with a second access point, at 302. The neighbor query request is configured to cause the station to query the second access point to obtain a second neighbor report. The first access point may periodically issue a neighbor query request, such as once an hour, once a day, or once a week, as illustrative, non-limiting examples. The first access point may include the first access point 110 that supports the first neighbor report 114 of FIG. 1A. The station and the second access point may include the station 120 and the second access point 130, respectively, of FIGS. 1A and 2. The neighbor query request may include the neighbor query request 140 of FIGS. 1A and 2. In a particular implementation, the first access point, the second access point, and/or the station have the same vendor (e.g., the same service provider).

The method 300 may further include receiving the second neighbor report from the station, at 304. The second neighbor report may be in compliance with a standard, such as an IEEE standard (e.g., an IEEE 802.11ai standard). For example, the second neighbor report may include a short neighbor report information element. The second neighbor report may include the second neighbor report 134 and/or may be included in the report messages 150, 152 of FIGS. 1A and 2.

In some implementations, method 300 may further include generating a beacon report request frame and wirelessly communicating the beacon report request frame from the first access point to the station. For example, the beacon report request frame may be in compliance with an Institute of Electrical and Electronics Engineers (IEEE) 802.11k standard and/or may be in compliance with another standard, such as a Wi-Fi Alliance standard. The beacon report request frame may include the neighbor query request. For example, the neighbor query request may be included in a vendor specified field or a reserved field of the beacon report request frame. As another example, the neighbor query request frame may include a request field (e.g., a measurement request field) that is populated with a request element, such as a short neighbor report (SNR) element identifier (ID). For example, the neighbor query request may be indicated by a short neighbor report (SNR) element identifier (ID), where the SNR element ID is included in a measurement field of the beacon request frame. Additionally, the first access point may receive a beacon report from the station that includes information that indicates an access point detected by the station. The first access point may generate the first neighbor report based on a neighboring access point identified in the second neighbor report, identified in the beacon report, or a combination thereof. For example, the first neighbor report may include a short neighbor report (SNR) that is in compliance with an Institute of Electrical and Electronics Engineers (IEEE) 802.11 standard, a Wi-Fi Alliance standard, or both.

The method 300 may enable the first access point to cause the station to provide a neighbor report to the first access point. For example, responsive to wirelessly communicating the neighbor query request to the station, the first access point may receive the second neighbor report from the second access point via the station. Based on an access point identified by the second neighbor report, the first access point can generate, maintain, and/or update the first neighbor report to indicate neighbor access points of the first access point.

Figure 4:
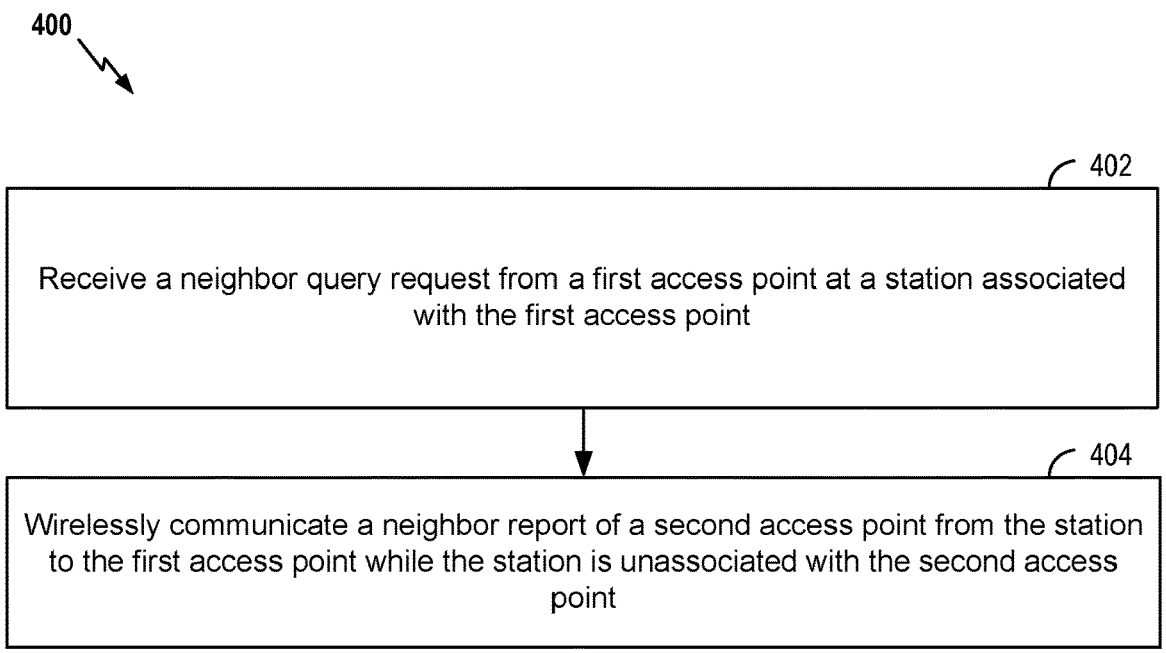
FIG. 4 is a flow diagram of an illustrative method of operating a station.

Referring to FIG. 4, an illustrative method of operating a station is described and designated 400. The method 400 may be performed using the station 120 of FIGS. 1A and 2.

The method 400 includes receiving a neighbor query request from a first access point at a station associated with the first access point, at 402. The first access point may include a first neighbor report, such as the first neighbor report 114 of FIG. 1A. The neighbor query request may be included in a beacon report request frame received at the station from the first access point. For example, the station and the first access point may include the station 120 and the first access point 110, respectively, of FIGS. 1A and 2. The neighbor query request may include the neighbor query request 140 of FIGS. 1A and 2. The neighbor query request may include first information to cause the station to wirelessly communicate a neighbor report request to a second access point.

If the neighbor query request is included in the beacon report request frame, the method 400 may include receiving the beacon report request frame from the first access point. The method 400 may also include detecting a short neighbor report (SNR) element identifier (ID) included in the beacon report request frame. The neighbor query request may be indicated by the SNR element ID. For example, the SNR element ID may be included in a measurement field of the beacon report request frame.

The method 400 further includes wirelessly communicating a neighbor report of a second access point from the station to the first access point while the station is unassociated with the second access point, at 404. If the station is unassociated with the second access point, the station may be in an unauthenticated state with respect to the second access point. The neighbor report may include the second neighbor report 134 of FIG. 1A. The neighbor report may be included in a report message, such as the second report message 152 of FIG. 1A, wirelessly communicated to the first access point from the station. The method 400 may thus enable the station that is unassociated with the second access point to request a neighbor report of the second access point.

In some implementations, the station may store the neighbor report (of the second access point) in a memory prior to receiving the neighbor query request from the first access point. In response to the neighbor query request, the method 400 may include retrieving the stored neighbor report from the memory. For example, a processor or a controller of the station may be configured to access the memory and to generate a copy of the stored neighbor report. The station may send the copy of the stored neighbor report to the first access point.

In other implementations, prior to wirelessly communicating the neighbor report to the first access point, the station may wirelessly communicate a neighbor report request, such as the neighbor report request 142 of FIGS. 1A and 2, to the second access point. The neighbor report request may include second information that causes the second access point to wirelessly communicate a second neighbor report to the station. For example, the second access point may include the second access point 130 of FIGS. 1A and 2. In some implementations, the station may generate an unsecured message, such as a public action frame, that includes the neighbor report request. For example, the public action frame may be a vendor specific public action frame.

In a particular implementation, the method 400 may further include receiving a second neighbor report from the second access point. For example, the station may scan a communication channel to obtain the neighbor report from the second access point. The station may receive the second neighbor report included in at least one of a beacon message, a probe response message, or a fast initial link setup (FILS) discovery frame that is wirelessly communicated by the second access point using the communication channel.

In another particular implementation, the station may receive a beacon report request frame the from the first access point. A short neighbor report (SNR) element identifier (ID) that indicates the neighbor query request may be included in the beacon report request frame and may be detected by the station. For example, the SNR element ID may be included in a measurement field of the beacon request frame. Responsive to the beacon report request frame, the station may generate a beacon report and wirelessly communicate the beacon report to the first access point. The beacon report may be distinct from the second neighbor report or may include the second neighbor report. Additionally or alternatively, the station may request the first access point to wirelessly communicate the first neighbor report to the station.

In another particular implementation, the first access point, the second access point, and the station have the same vendor. Alternatively, the second access point and the station may be from different vendors. If the second access point and the station are from different vendors, the station may not receive the requested second neighbor report from the second access point in response to the neighbor report request. Instead, the station may receive a message including an asserted incapable flag or an asserted refused flag from the second access point.

Figure 5:
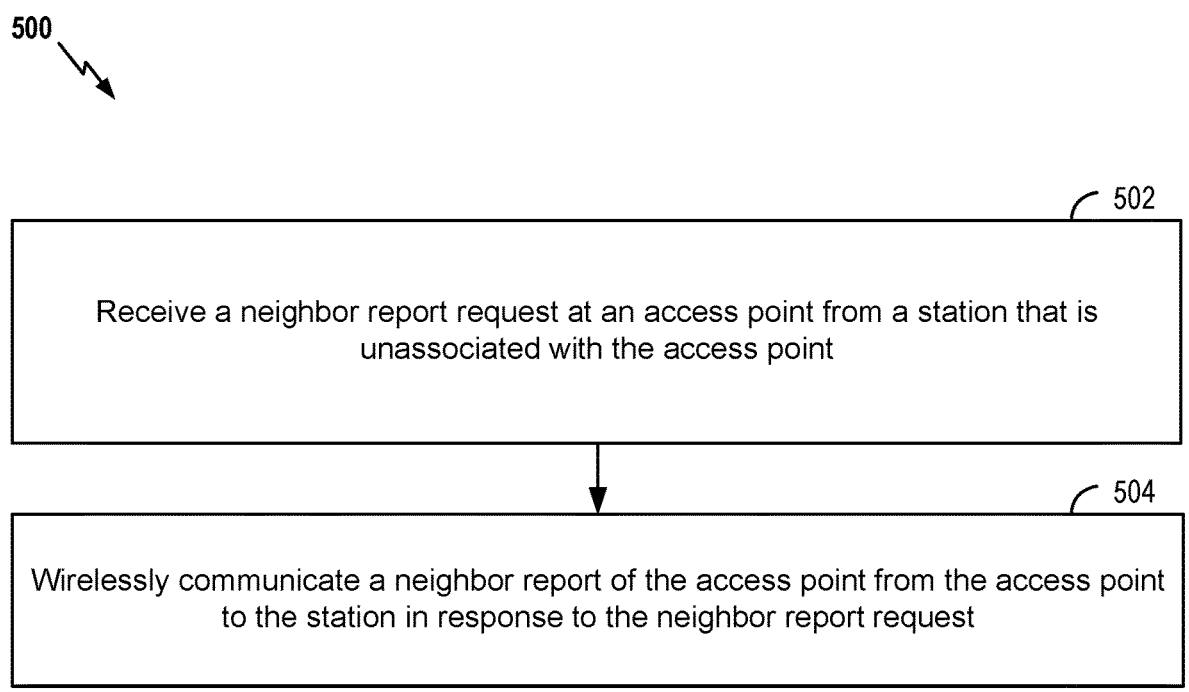
FIG. 5 is a flow diagram of an illustrative method of operating an access point.

Referring to FIG. 5, another illustrative method of operating an access point is described and designated 500. The method 500 may be performed using one of the access points 110, 130 of FIGS. 1A and 2 or one of the access points 260, 270, 280, 290 of FIG. 2.

The method 500 includes receiving a neighbor report request at an access point from a station that is unassociated with the access point, at 502. The neighbor report request may be included in a first unsecured message, such as a first public action frame. For example, the station and the access point may include the station 120 and the second access point 130, respectively, of FIGS. 1A and 2. The neighbor report request may include the neighbor report request 142 of FIGS. 1A and 2. As another example, the neighbor report request may be included in a beacon request frame. To illustrate, the neighbor report request may be indicated by a short neighbor report (SNR) element identifier (ID) that is included a field, such as a measurement field, of the beacon report request frame. The station may be configured to detect the SNR element ID included in the beacon request frame.

The method 500 further includes wirelessly communicating a neighbor report of the access point from the access point to the station in response to the neighbor report request, at 504. The neighbor report may include a short neighbor report (SNR) information element (IE) and may be wirelessly communicated to the station when the station is unassociated with the access point. The neighbor report of the access point may be in compliance with a standard, such as an Institute of Electrical and Electronics Engineers (IEEE) 802.11 standard or a Wi-Fi Alliance standard. The neighbor report wirelessly communicated to the station may be included in a second unsecured message, such as a second public action frame. The second unsecured message may be a vendor specific public action frame. Alternatively, the neighbor report may be wirelessly communicated to the station in a beacon message or a probe response message from the access point. The neighbor report may be included in the report message 150 of FIGS. 1A and 2. The method 500 may enable the access point to provide the neighbor report to the unassociated station.

Figure 6:
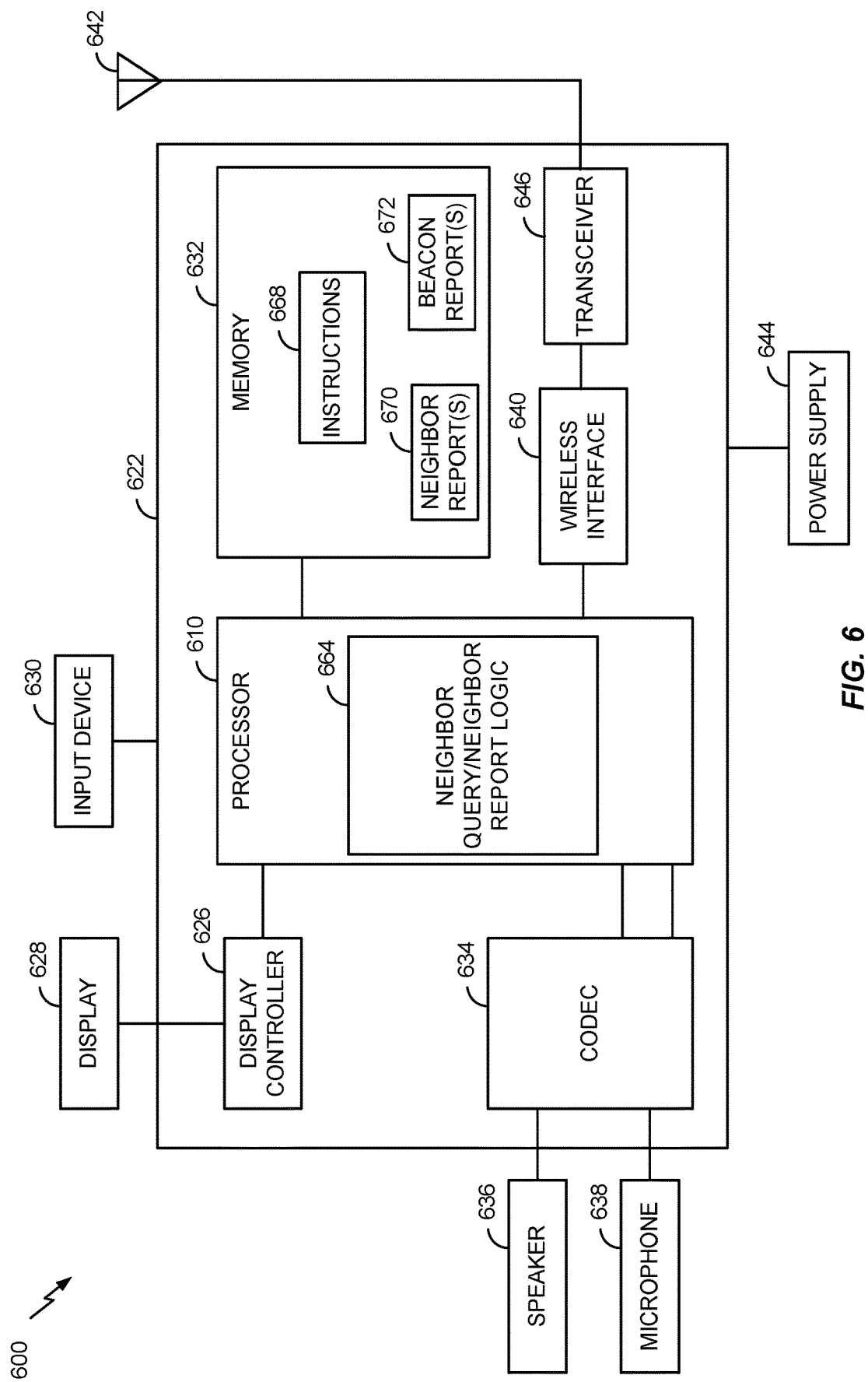
FIG. 6 is a diagram of a wireless device that is operable to support various aspects of one or more methods, systems, apparatuses, and/or computer-readable media disclosed herein.

Referring to FIG. 6, a block diagram of a particular illustrative wireless communication device is depicted and generally designated 600. The device 600 includes a processor 610, such as a digital signal processor, coupled to a memory 632. In an illustrative example, the device 600, or components thereof, may include, or be included in, the access points 110, 130, the station 120 of FIGS. 1A and 2, the access points 260, 270, 280, 290 of FIG. 2, or components thereof.

The processor 610 may be configured to execute software (e.g., a program of instructions 668) stored in the memory 632, such as a non-transitory computer readable medium. Additionally or alternatively, the processor 610 may be configured to implement instructions stored in a memory of a wireless interface 640 (e.g., an IEEE 802.11 wireless interface and/or a Wi-Fi Alliance standard compliant interface). In a particular implementation, the processor 610 may be configured to operate in accordance with one or more of the methods of FIGS. 3-5. For example, the processor 610 may include neighbor query/neighbor report logic 664 to execute at least one of the methods of FIGS. 3-5. The processor 610 may also be configured to receive, determine, store, and/or retrieve (e.g., access) a neighbor report(s) 670 and/or a beacon report(s) 672. For example, the neighbor report(s) 670 and/or the beacon report(s) 672 may be stored in the memory 632. In some implementations, the neighbor report(s) 670 may include the first neighbor report 114 and/or the second neighbor report 134, as illustrative, non-limiting examples. In other implementations, the beacon report(s) 672 may include a beacon report generated by a station, such as the station 120 of FIGS. 1A and 2.

The wireless interface 640 may be coupled to the processor 610 and to an antenna 642. For example, the wireless interface 640 may be coupled to the antenna 642 via a transceiver 646, such that wireless data received via the antenna 642 and may be provided to the processor 610. The transceiver 646 may include a transmitter, a receiver, or a combination thereof. The transceiver 646 may be configured to wirelessly communicate (e.g., transmit and/or receive) data, such as a neighbor report, a beacon report, a beacon report request frame, a neighbor query request, a beacon message, a probe message, a fast initial link setup (FILS) discovery frame, or a combination thereof, as illustrative, non-limiting examples. For example, the processor 610 may be configured to initiate a neighbor report (e.g., the second neighbor report 134) to be wirelessly communicated by the transceiver 646 to an associated first access point (e.g., the first access point 110).

A coder/decoder (CODEC) 634 can also be coupled to the processor 610. A speaker 636 and a microphone 638 can be coupled to the CODEC 634. A display controller 626 can be coupled to the processor 610 and to a display device 628. In a particular implementation, the processor 610, the display controller 626, the memory 632, the CODEC 634, and the wireless interface 640 are included in a system-in-package or system-on-chip device 622. In some implementations, an input device 630 and a power supply 644 are coupled to the system-on-chip device 622. Moreover, as illustrated in FIG. 6, the display device 628, the input device 630, the speaker 636, the microphone 638, the antenna 642, and the power supply 644 may be external to the system-on-chip device 622. However, each of the display device 628, the input device 630, the speaker 636, the microphone 638, the antenna 642, and the power supply 644 can be coupled to at least one component of the system-on-chip device 622, such as an interface or a controller.

In conjunction with the described aspects, a first apparatus includes means for wirelessly communicating, from a first access point to a station that is associated with the first access point, a neighbor query request to the station. The neighbor query request may include information that causes the station to query a second access point to obtain a neighbor report. The station may be unassociated with the second access point. For example, the means for wirelessly communicating may include the access points 110, 130 of FIGS. 1A and 2, the access points 260, 270, 280, 290 of FIG. 2, the wireless interface 640, the transceiver 646, the processor 610 programmed to execute the instructions 668, the neighbor query/neighbor report logic 664, the wireless communication device 600 of FIG. 6, another device, circuit, module, or other instructions to wirelessly communicate the neighbor query request, or any combination thereof.

The first apparatus also includes means for receiving the neighbor report from the station. For example, the means for receiving may include the access points 110, 130 of FIGS. 1A and 2, the access points 260, 270, 280, 290 of FIG. 2, the wireless interface 640, the transceiver 646, the processor 610 programmed to execute the instructions 668, the neighbor query/neighbor report logic 664, the wireless communication device 600 of FIG. 6, another device, circuit, module, or other instructions to receive the neighbor report, or any combination thereof.

In conjunction with the described aspects, a second apparatus includes means for receiving, at a station associated with a first access point, a neighbor query request from the first access point. For example, the means for receiving may include the station 120 of FIGS. 1A and 2, the wireless interface 640, the transceiver 646, the processor 610 programmed to execute the instructions 668, the neighbor query/neighbor report logic 664, the wireless communication device 600 of FIG. 6, another device, circuit, module, or other instructions to receive the neighbor query request, or any combination thereof.

The second apparatus also includes means for wirelessly communicating, from the station to a second access point, a neighbor report request based on the neighbor query request. The station is unassociated with the second access point. For example, the means for wirelessly communicating may include the station 120 of FIGS. 1A and 2, the wireless interface 640, the transceiver 646, the processor 610 programmed to execute the instructions 668, the neighbor query/neighbor report logic 664, the wireless communication device 600 of FIG. 6, another device, circuit, module, or other instructions to wirelessly communicate the neighbor report request, or any combination thereof.

In conjunction with the described aspects, a third apparatus includes means for receiving, at an access point from a station that is unassociated with the access point, a neighbor report request. For example, the means for receiving may include the access points 110, 130 of FIGS. 1A and 2, the access points 260, 270, 280, 290 of FIG. 2, the wireless interface 640, the transceiver 646, the processor 610 programmed to execute the instructions 668, the neighbor query/neighbor report logic 664, the wireless communication device 600 of FIG. 6, another device, circuit, module, or other instructions to receive the neighbor report request, or any combination thereof.

The third apparatus also includes means for wirelessly communicating, to the station, a neighbor report of the access point in response to the neighbor report request. For example, the means for wirelessly communicating may include the access points 110, 130 of FIGS. 1A and 2, the access points 260, 270, 280, 290 of FIG. 2, the wireless interface 640, the transceiver 646, the processor 610 programmed to execute the instructions 668, the neighbor query/neighbor report logic 664, the wireless communication device 600 of FIG. 6, another device, circuit, module, or other instructions to wirelessly communicate the neighbor report, or any combination thereof.

In conjunction with the described aspects, a fourth apparatus includes means for receiving, at a station that is associated with a first access point, a neighbor report from a second access point. The station is unassociated with the second access point. For example, the means for receiving may include the station 120 of FIGS. 1A and 2, the wireless interface 640, the transceiver 646, the processor 610 programmed to execute the instructions 668, the neighbor query/neighbor report logic 664, the wireless communication device 600 of FIG. 6, another device, circuit, module, or other instructions to receive the neighbor report, or any combination thereof.

The fourth apparatus also includes means for wirelessly communicating the neighbor report to the first access point. For example, the means for wirelessly communicating may include the station 120 of FIGS. 1A and 2, the wireless interface 640, the transceiver 646, the processor 610 programmed to execute the instructions 668, the neighbor query/neighbor report logic 664, the wireless communication device 600 of FIG. 6, another device, circuit, module, or other instructions to wirelessly communicate the neighbor report, or any combination thereof.

Although one or more of FIGS. 1-6 may illustrate systems, apparatuses, and/or methods according to the teachings of the disclosure, the disclosure is not limited to these illustrated systems, apparatuses, and/or methods. One or more functions or components of any of FIGS. 1-6 as illustrated or described herein may be combined with one or more other portions of another of FIGS. 1-6. Accordingly, no single aspect described herein should be construed as limiting and aspects of the disclosure may be suitably combined without departing form the teachings of the disclosure.

Those of skill would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method of wireless communication comprising:
  receiving, by a first wireless station, from a first wireless access point to which the first wireless station is associated, a neighbor query request indicating to the first wireless station to identify wireless access points neighboring another wireless access point;
  transmitting, from the first wireless station to a second wireless access point to which the first wireless station is not associated, responsive to receiving the neighbor query request, a neighbor report request indicating to the second wireless access point to identify wireless access points neighboring the second wireless access point, the neighbor report request being generated, by the first wireless station, for the second wireless access point, the neighbor report request being different from the neighbor query request;
  receiving, by the first wireless station from the second wireless access point while the first wireless station is unassociated with the second wireless access point, a neighbor report of the second wireless access point, the neighbor report identifying each of one or more wireless access points that neighbor the second wireless access point; and
  transmitting, by the first wireless station to the first wireless access point while the first wireless station is unassociated with the second wireless access point, information associated with the neighbor report.

2. The method of claim 1, wherein the neighbor query request instructs or causes the first wireless station to query the second wireless access point for the neighbor report, and wherein the transmitting of the information includes sending the neighbor report.

3. The method of claim 1, further comprising, in response to receiving the neighbor query request, scanning a communication channel to obtain the neighbor report from the second wireless access point, wherein the neighbor report identifies wireless access points that neighbor the second wireless access point and is received from the second wireless access point in a beacon message, a probe response message, or a fast initial link setup (FILS) discovery frame via the communication channel.

4. The method of claim 1, wherein the neighbor query request is received in a beacon report request frame from the first wireless access point, the method further comprising, in response to receiving the neighbor query request, retrieving a stored neighbor report from a memory, wherein the stored neighbor report comprises the neighbor report.

5. The method of claim 1, wherein the neighbor report request is transmitted to the second wireless access point in a public action frame.

6. The method of claim 1, further comprising:
receiving, at the first wireless station after the neighbor query request, a wireless communication that indicates whether a wireless access point and the first wireless station are from different vendors based on the wireless communication including an asserted incapable flag or an asserted refused flag.

7. A wireless station comprising:
a processor; and
a memory accessible by the processor, the memory comprising instructions executable by the processor to:
receive, from a first wireless access point to which the wireless station is associated, a neighbor query request indicating to the wireless station to identify wireless access points neighboring another wireless access point;
transmit, to a second wireless access point to which the wireless station is not associated, responsive to receiving the neighbor query request, a neighbor report request indicating to the second wireless access point to identify wireless access points neighboring the second wireless access point, the neighbor report request being different from the neighbor query request;
receive, from the second wireless access point while the wireless station is unassociated with the second wireless access point, a neighbor report of the second wireless access point, the neighbor report identifying each of one or more wireless access points that neighbor the second wireless access point; and
transmit, to the first wireless access point while the wireless station is unassociated with the second wireless access point, information associated with the neighbor report.

8. The wireless station of claim 7, wherein the neighbor report is in compliance with an Institute of Electrical and Electronics Engineers (IEEE) 802.11ai specification, an IEEE 802.11k specification, or any combination thereof.

9. The wireless station of claim 8, wherein the neighbor report comprises a short neighbor report (SNR) information element (IE) that is in compliance with the IEEE 802.11ai specification or comprises a beacon report that is in compliance with the IEEE 802.11k specification.

10. The wireless station of claim 7, further comprising a transmitter and an antenna coupled to the processor via the transmitter, wherein the memory, the processor, the transmitter, and the antenna are incorporated into a mobile communication device.

11. The wireless station of claim 7, wherein the instructions are further executable by the processor to: receive a beacon report request frame from the first wireless access point, wherein the beacon report request frame includes the neighbor query request.

12. The wireless station of claim 11, wherein the neighbor query request is included in a vendor specific field or a reserved field of the beacon report request frame.

13. The wireless station of claim 7, wherein the neighbor query request is included in a beacon report request frame that includes a measurement field and includes a short neighbor report (SNR) element identifier (ID).

14. The wireless station of claim 11, wherein the beacon report request frame is in compliance with an Institute of Electrical and Electronics Engineers (IEEE) 802.11k specification.

15. The wireless station of claim 11, wherein the instructions are further executable by the processor to:
generate a beacon report in response to the beacon report request frame received from the first wireless access point; and
wirelessly communicate the beacon report to the first wireless access point, wherein the beacon report comprises the neighbor report.

16. The method of claim 1, wherein the neighbor query request includes information, from the first wireless access point, that instructs the first wireless station to provide one or more neighbor reports from one or more wireless access points, and the neighbor report request is generated, by the first wireless station, in response to the neighbor query request.

17. The method of claim 1, wherein the neighbor report identifies wireless access points neighboring the second wireless access point, and wherein the neighbor report further indicates, for at least one of the identified wireless access points, at least one of an operating channel of the identified wireless access point, a media access control (MAC) address of the identified wireless access point or a signal strength of the identified wireless access point.

18. The method of claim 1, wherein the neighbor report is in compliance with an Institute of Electrical and Electronics Engineers (IEEE) 802.11ai specification, an IEEE 802.11k specification, or a combination thereof.

19. The method of claim 18, wherein the neighbor report comprises a short neighbor report (SNR) information element (IE) that is in compliance with the IEEE 802.11ai specification or comprises a beacon report that is in compliance with the IEEE 802.11k specification.

20. The method of claim 1, wherein the neighbor query request is received in a beacon report request frame that includes a measurement field and includes a short neighbor report (SNR) element identifier (ID).

21. The method of claim 2, wherein the beacon report request frame is in compliance with an Institute of Electrical and Electronics Engineers (IEEE) 802.11k specification.

22. The method of claim 2, further comprising:
generating a beacon report in response to the beacon report request frame; and
wirelessly transmitting the beacon report to the first wireless access point, the beacon report including the neighbor report.

23. The wireless station of claim 7, wherein:
the neighbor query request is configured to instruct the apparatus to provide at least one neighbor report from at least one wireless access point, and
the neighbor report request is configured to request the second wireless access point to wireless communicate the neighbor report to the apparatus.

24. The wireless station of claim 7, wherein the neighbor report identifies wireless access points neighboring the second wireless access point, and wherein the neighbor report further indicates, for at least one of the identified wireless access points, at least one of an operating channel of the identified wireless access point, a media access control (MAC) address of the identified wireless access point or a signal strength of the identified wireless access point.

25. The wireless station of claim 7, wherein:
the instructions are further executable by the processor to, in response to receiving the neighbor query request, scan a communication channel to obtain the neighbor report from the second wireless access point; and receive the neighbor report comprises receiving the neighbor report from the second wireless access point in a beacon message, a probe response message, or a fast initial link setup (FILS) discovery frame via the communication channel.

26. The wireless station of claim 7, wherein the instructions are further executable by the processor to, in response to receiving the neighbor query request, retrieving a stored neighbor report from a memory, wherein the stored neighbor report comprises the neighbor report.

27. The wireless station of claim 7, wherein to transmit the neighbor report request to the second wireless access point, the instructions are executable by the processor to transmit a public action frame that includes the neighbor report request to the second wireless access point.

* * * * *